(12) United States Patent
Järgenstedt

(10) Patent No.: US 7,302,337 B2
(45) Date of Patent: Nov. 27, 2007

(54) METHOD AND COMPUTER PROGRAM FOR IDENTIFYING A FAULT IN AN ENGINE

(75) Inventor: Mats Järgenstedt, Södertälje (SE)

(73) Assignee: Scania CV AB ((publ) (SE)

( * ) Notice: Subject to any disclaimer, the term of this patent is extended or adjusted under 35 U.S.C. 154(b) by 296 days.

(21) Appl. No.: 10/521,419

(22) PCT Filed: Apr. 15, 2003

(86) PCT No.: PCT/SE03/00602

§ 371 (c)(1),
(2), (4) Date: Feb. 24, 2005

(87) PCT Pub. No.: WO2004/003503

PCT Pub. Date: Jan. 8, 2004

(65) Prior Publication Data

US 2005/0119818 A1   Jun. 2, 2005

(30) Foreign Application Priority Data

Jun. 28, 2002   (SE) .................................... 0202005

(51) Int. Cl.
*G06F 17/00* (2006.01)

(52) U.S. Cl. ........................ 701/114; 701/115; 701/102; 73/117.3

(58) Field of Classification Search ................ 701/114, 701/110, 115, 102, 101, 103; 123/478, 479, 123/198; 73/116, 117.3
See application file for complete search history.

(56) References Cited

U.S. PATENT DOCUMENTS

| 3,972,230 | A | | 8/1976 | Hanson et al. ................. 73/116 |
| 4,593,665 | A | * | 6/1986 | Kishi ........................... 123/478 |
| 4,941,445 | A | * | 7/1990 | Deutsch ....................... 123/479 |
| 5,560,341 | A | | 10/1996 | Machida ...................... 123/479 |
| 5,709,192 | A | | 1/1998 | Zimmermann ............... 123/436 |
| 5,979,407 | A | | 11/1999 | Wang et al. ................. 123/479 |

FOREIGN PATENT DOCUMENTS

| DE | 31 05 331 | | 9/1982 |
| DE | 40 02 210 | | 8/1991 |
| DE | 195 40 826 | | 5/1997 |
| DE | 198 13 495 | | 7/1999 |
| DE | 100 55 192 | | 5/2002 |
| JP | 22002-106390 A | * | 4/2002 |

* cited by examiner

*Primary Examiner*—Hieu T. Vo
(74) *Attorney, Agent, or Firm*—Ostrolenk, Faber, Gerb & Soffen, LLP

(57) ABSTRACT

A method for identifying a fault associated with an individual cylinder of a multicylinder combustion engine, comprising the steps of: accelerating the combustion engine to a first engine speed (L1); interrupting the fuel supply to all cylinders except the individual cylinder, which receives a predetermined amount of fuel supply, when the first engine speed is reached; and counting the time it takes for the speed of the combustion engine to decrease from either the first engine speed or a second engine speed (L2), which is lower than the first engine speed, down to a third engine speed (L3). A computer, a computer program and a computer program product which use the method.

19 Claims, 3 Drawing Sheets

METHOD AND COMPUTER PROGRAM FOR IDENTIFYING A FAULT IN AN ENGINE

TECHNICAL FIELD OF THE INVENTION

The present invention relates to a method for identifying a fault associated with an individual cylinder of a multicylinder combustion engine. The method also relates to a computer program, a computer program product and a computer for identifying a fault associated with the individual cylinder.

DESCRIPTION OF RELATED ART

When a multicylinder combustion engine fails to deliver its rated power, the problem may arise from the weakness or malfunctioning of one or two cylinders out of a total of, for example, eight cylinders. In the case of a diesel engine, malfunctioning of a cylinder may be due to underfueling caused by failure of the fuel injector or to worn piston rings and valves which cause loss of compression. In case of a spark-ignition type engine, the malfunctioning of a cylinder may also be due to a faulty spark plug. Evidence of a malfunction may be roughness of engine operation, poor cylinder compression or reduced engine torque.

Today there exist a number of methods known to a person skilled in the art of identifying a weak or defective cylinder. In a common method for measuring the output torque from an individual cylinder in an internal combustion engine, the fuel supply to the cylinder to be tested is interrupted, whereas the other cylinders receive a predetermined quantity of fuel. The speed of the engine (in rpm) is monitored during an acceleration of the engine and the time it takes for the speed to increase from a starting speed to a higher speed is counted. A relatively long acceleration time implies that the cylinder delivers a relatively high torque. The cylinders are thereby not tested one at a time. If there is something wrong with two or more fuel injectors/cylinders, it becomes very difficult to determine which ones and the accuracy of the measured torque compared to the actual torque is deteriorated since the measured torque originates from several cylinders. Therefore such methods require several other tests in order to relate a fault to a specific cylinder.

DE-19540826-A1 discloses a method for identifying individual cylinder faults. First, a specified operating condition of an IC engine is set and the rpm of the engine is determined. Then the fuel supply to the cylinder under test is interrupted. The rpm is redetermined. After that, it is determined whether the difference of the rpm before the fuel interruption minus the rpm after the fuel interruption is smaller than a predetermined limit value. If the answer is yes, a faulty function data related to this cylinder is produced. Also this method suffers from several disadvantages. One disadvantage is that the fuel injected to the cylinders has to be relatively low in order to stop the engine from racing. The interruption of fuel to only one cylinder is not enough to stop the engine from racing if the other cylinders receive a large quantity of fuel. However, there normally is a desire to test the engine when both running at a speed and having a supply of fuel according to typical driving situations for a vehicle, i.e. at a speed where the engine would race if this method is applied. Another disadvantage is that the difference between the rpm before and after the fuel interruption is relatively small for an engine with several cylinders. This makes it more difficult to read the difference and guess the character of a fault than if the difference was larger. One or more of the cylinders or fuel injectors to which fuel is supplied during the retardation that follows after the fuel interruption to the cylinder under test may be malfunctioning or they may have a reduced capacity and therefore introduce substantial variations during a whole or a part of a revolution. This also makes it more difficult to interpret the difference.

SUMMARY OF THE INVENTION

An object of the invention is to provide a reliable and accurate method for testing individual cylinders, which method makes it easy to discover problems associated with an individual cylinder.

The invention relates to a method for identifying a fault associated with an individual cylinder of a multicylinder combustion engine. The method comprises the steps of:
accelerating the combustion engine to a first engine speed;
interrupting the fuel supply to all cylinders except the individual cylinder, which receives a predetermined amount of fuel supply, when the first engine speed is reached; and
counting the time it takes for the speed of the combustion engine to decrease from either the first engine speed or a second engine speed, which is lower than the first engine speed, down to a third engine speed, which is lower than the second speed. Hereby is achieved that fuel only is supplied to the individual cylinder during the counting step of the method. Moreover, it is achieved that an individual cylinder may be tested during an engine speed corresponding to typical driving/cruising speeds of a vehicle and that the amount of fuel injected into the cylinder also corresponds to a typical driving situation. Engine speed is throughout the description and the claims defined as the commonly measured rotation speed of the engine in rpm or any corresponding parameter originated from the rotation speed of the engine. Furthermore, a counted deceleration time is achieved, which may be used in calculations or comparisons with reference values in order to easily discover and identify a fault associated with the individual cylinder.

In one embodiment, the method comprises the further step of supplying a substantially equal first amount of fuel to all cylinders during the step of accelerating the combustion engine. Hereby a fast acceleration and an evenly distributed work load between all the cylinders are achieved.

In another embodiment, the method comprises the step of interrupting the fuel supply to the individual cylinder after the third engine speed has been reached. Hereby is achieved that no fuel is wasted during a further deceleration of the engine speed. Furthermore, the deceleration is faster, which provides for a quicker method.

In yet another embodiment, the method comprises the step of keeping the speed of the combustion engine at a substantially constant low speed, which is lower than the third engine speed, before the method is repeated for testing the individual cylinder again or another of the cylinders of the combustion engine. Hereby an initial state for the engine can be achieved, in which state e.g. the rpm, fuel supply and charge air pressure are known. This makes the method even more reliable, since the method preferably always is started from the initial state and it is thereby easy to repeat the test with comparable test results.

In still another embodiment, the method comprises the step of comparing the counted time with a predetermined time representing a deceleration time for a well-functioning cylinder. Hereby an easy and fast way of identifying that there is a problem with an individual cylinder is achieved.

Suitably the combustion engine is a diesel engine in a vehicle, such as a truck.

The invention also relates to a computer program for identifying a fault associated with an individual cylinder of a multicylinder combustion engine, comprising
computer readable program code means, which when run on a computer, such as an engine control unit or a computer connected to the engine control unit, causes an engine control unit to cause an acceleration of the combustion engine to a first engine speed;
computer readable program code means for causing the engine control unit to interrupt the fuel supply to all cylinders except the individual cylinder, which receives a predetermined amount of fuel supply, when the first engine speed is reached; and
computer readable program code means for causing either the engine control unit or another computer connected to the engine control unit to count the time it takes for the speed of the combustion engine to decrease from either the first engine speed or a second engine speed, which is lower than the first engine speed, down to a third engine speed.

The computer program may comprise computer readable program code means for causing the engine control unit or another computer connected to the engine control unit to display a graphical user interface on a display. Hereby the advantages with a graphical user interface can be utilised for starting the method and displaying results from the method.

The computer program may comprise computer readable program code means for causing the engine control unit or another computer connected to the engine control unit to check whether all of at least one criterion for testing the individual cylinder is fulfilled. Hereby is achieved that the computer program may prevent the method from starting or interrupting the method at any time, if the at least one criterion is not fulfilled. This gives a safer testing, and helps to prevent accidents.

The computer program may also comprise computer readable program code means for causing the engine control unit or another computer connected to the engine control unit to compare a stored predetermined time with the time it takes for the speed of the combustion engine to decrease from either the first engine speed or the second engine speed to the third engine speed.

Furthermore the invention relates to a computer program product, such as a floppy disc, CD, DVD, flash memory, harddisk etc., comprising the computer program and a computer readable medium on which the computer program is stored. Hereby is achieved that the computer program easily can be loaded into and processed by computers.

Moreover, the invention relates to a computer, such as an embedded electronic engine control unit or a vehicle external computer comprising a storing means and a computer program according to claim 7 stored in the storing means. Hereby is achieved that an internal computer, such as an electronic engine control unit in a vehicle, as well as external computers connected to the engine control unit, are able to control the method according to the invention.

BRIEF DESCRIPTION OF THE DRAWINGS

The objects, advantages and effects as well as features of the present invention will be more readily understood from the following detailed description of an example of a method, control unit, computer and computer program, as well as other embodiments, when read together with the accompanying drawings, in which.

DETAILED DESCRIPTION OF EMBODIMENTS

Figure 1:
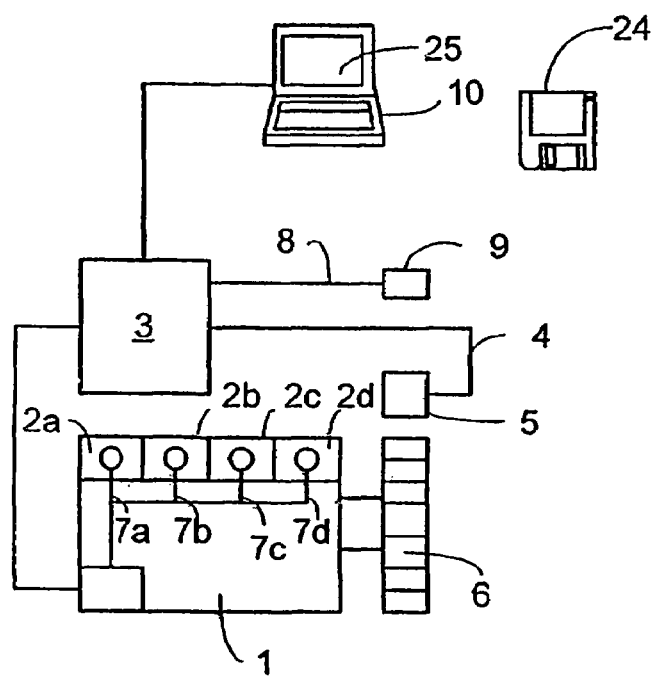
FIG. 1 shows a schematic block diagram of a system for performing a method according to the invention.

While the invention covers various modifications and alternative constructions, some embodiments of the invention are shown in the drawings and will hereinafter be described in detail. However, it is to be understood that the specific description and drawings are not intended to limit the invention to the specific forms disclosed. On the contrary, it is intended that the scope of the claimed invention includes all modifications and alternative constructions thereof falling within the spirit and scope of the invention as expressed in the appended claims to the full range of their equivalents.

FIG. 1 shows a schematic block diagram of a system for performing a method according to the invention. A vehicle (not shown), such as a truck and a ship, comprises an internal combustion engine 1 in the form of a diesel engine, here comprising four cylinders 2a-2d. The number of cylinders is kept to four for illustration purposes only. It must be understood that the invention is applicable to any multicylinder combustion engine with any known number of cylinders. Moreover, although the embodiment described here relates to a combustion engine arranged in a vehicle, a person skilled in the art appreciates that the invention also is applicable to combustion engines not arranged in a vehicle; the combustion engine may for example be installed in a power plant. The combustion engine 1 is controlled by an electronic engine control unit 3 embedded in the vehicle. The engine control unit 3 is adapted to receive sensed engine data in the form of e.g. a toothed flywheel signal (TF-signal) and a gear signal. The TF-signal is received on a first line 4 from an engine-speed sensor 5 which senses rotation of the engine's toothed flywheel 6. The engine-speed sensor 5 may be e.g. an inductive type sensor or a hall-effect sensor. Of course there may be more than one engine-speed sensor 5 and other positions for measuring the engine speed, such as measuring the rotation the combustion engine's 1 crankshaft (not shown). The engine control unit 3 is also adapted to send control signals through a set of second lines 7a-7d to a fuel injector unit (not shown) respectively, for the supply of fuel to each cylinder 2a-2d. The gear signal is a discrete signal received on a third line 8 from e.g. a discrete transmission sensor 9, which typically provides the gear signal when the transmission is in neutral. All this is known to a person skilled in the art and is therefore not described more in detail.

In this embodiment the engine control unit 3 is connected to a vehicle external computer 10, for example an external PC laptop, through which the method according to the invention is initiated. Although not shown in FIG. 1 the external computer 10 may of course be indirectly connected to the engine control unit 3 via one or more other embedded or external electronic control units, gateways and interfaces. The communication between the external computer 10 and the engine control unit 3 may of course also be partly or substantially wireless.

Figure 2:
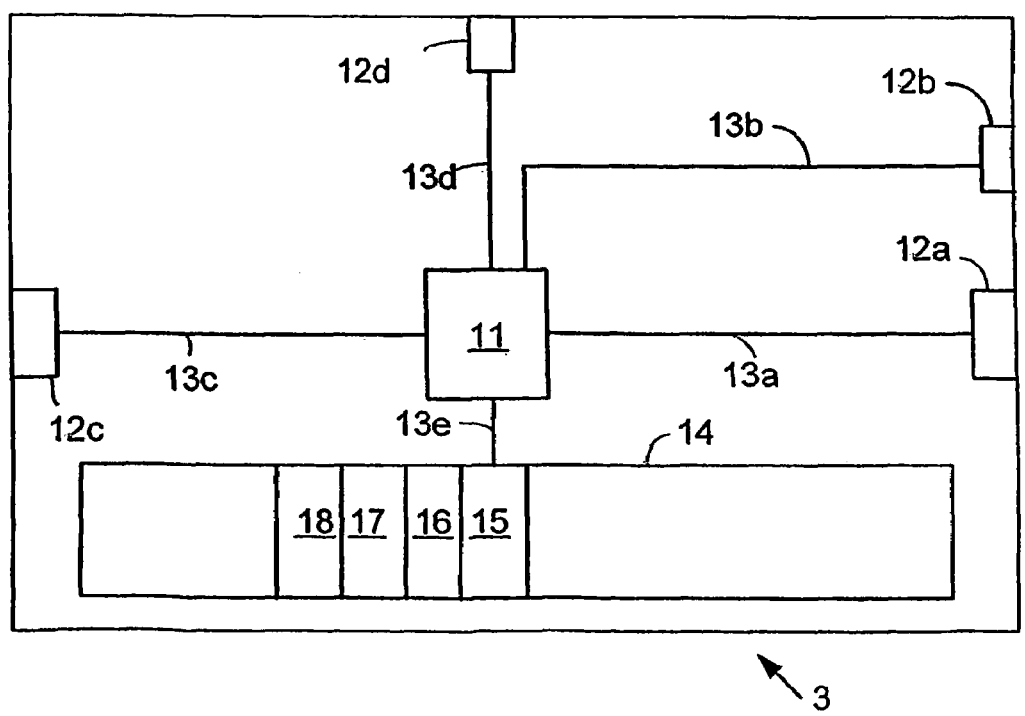
FIG. 2 shows an engine control unit according to the invention.

FIG. 2 schematically shows the engine control unit 3, which comprises a first CPU 11 connected to a first port 12a via a first bus 13a in order to receive the TF-signal from the engine-speed sensor 5, a second port 12b via a second bus 13b for receiving the gear signal from the transmission sensor 9, a third port 12c via a third bus 13c for communication with the injector units and a fourth port 12d via a fourth bus 13d for communication with the external computer 10. The first CPU 11 is also connected to at least one storing means 14, such as a hard disk, a flash memory and a ROM (Read-only memory), via a fifth bus 13e. The engine control unit 3 suitably also comprises other components commonly used in an ECU (Electronic Control Unit) for vehicles, e.g. a Random-Access memory; an EEPROM, a Bus Controller and A/D-converters (not shown) in the case where e.g. both the gear signal and TF-signal are analogue signals. Installed in the storing means 14 are e.g. an engine speed sensor interface computer program 15 for interpreting the TF-signal, a transmission sensor interface computer program 16 for interpreting the gear signal, a fuel control computer program 17 for controlling the supply of fuel to the cylinders 2a-d and a first communication interface computer program 18 for communication with the external computer 10. These computer programs 15-18 may be program modules in an engine control computer program. It must also be understood that several functions may be implemented as partly software and hardware as known to a person skilled in the art.

Figure 3:
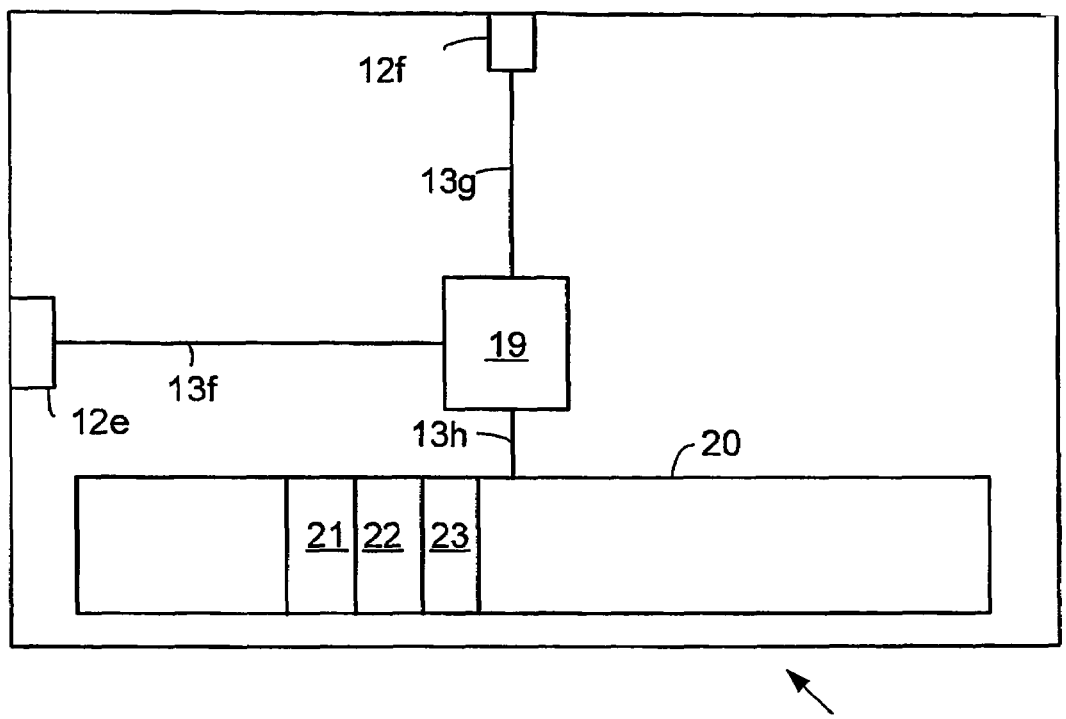
FIG. 3 shows a block diagram of a method according to the invention, FIG. 4 schematically shows a graph of the engine speed over a testing period.

FIG. 3 schematically shows an example of the external computer 10, which comprises a second CPU 19 connected to a fifth port 12e via a sixth bus 13f for communication with the engine control unit 3 and a sixth port 12f via a seventh bus 13g for communication with a display, which may show a graphical or character-based user interface. The second CPU 19 is also connected to at least one second storing means 20, such as a hard disk, a flash memory and a ROM via an eighth bus 13h. The second storing means 20 comprises a cylinder test computer program, which suitably comprises a second communication interface program module 21 for communication with the engine control unit 3, a user interface program module 22 and a criteria checking program module 23. The cylinder test computer program may be downloaded to the external computer, e.g. directly from a computer program product 24, such as a floppy disk (see FIG. 1), an external hard disk, a CD, a DVD and a flash memory, and through a server via a Local Area Network or Wide Area Network. Although not shown in any figures as alternative embodiments, it must be understood that the invention also comprises embodiments where at least a part of the cylinder test computer program may be installed as separate computer programs in the engine control unit and/or another ECU in the vehicle in order to e.g. create redundancy or a distributed cylinder test computer program.

Figure 4:
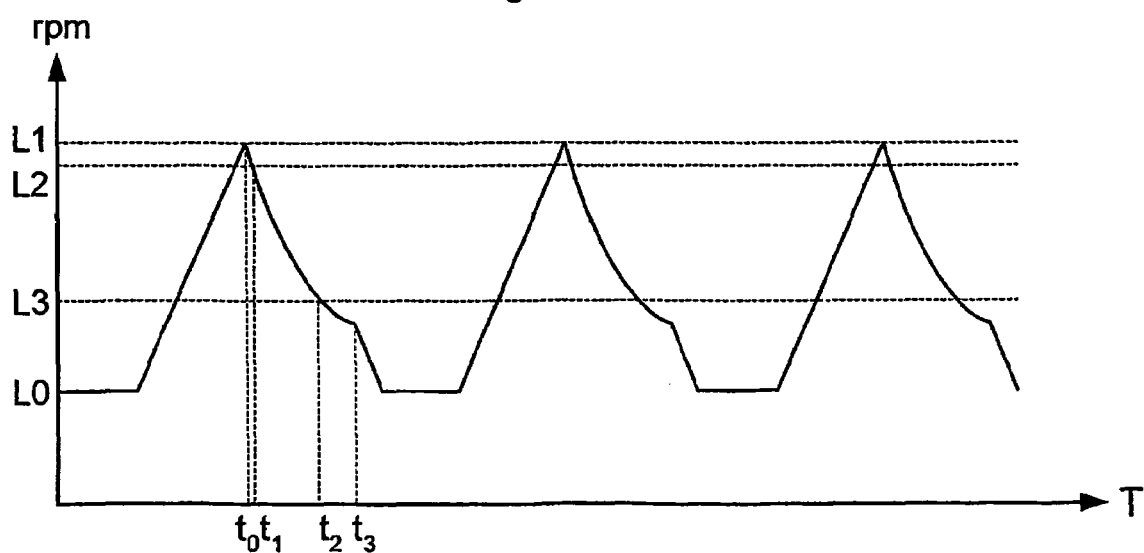
Figure 5:
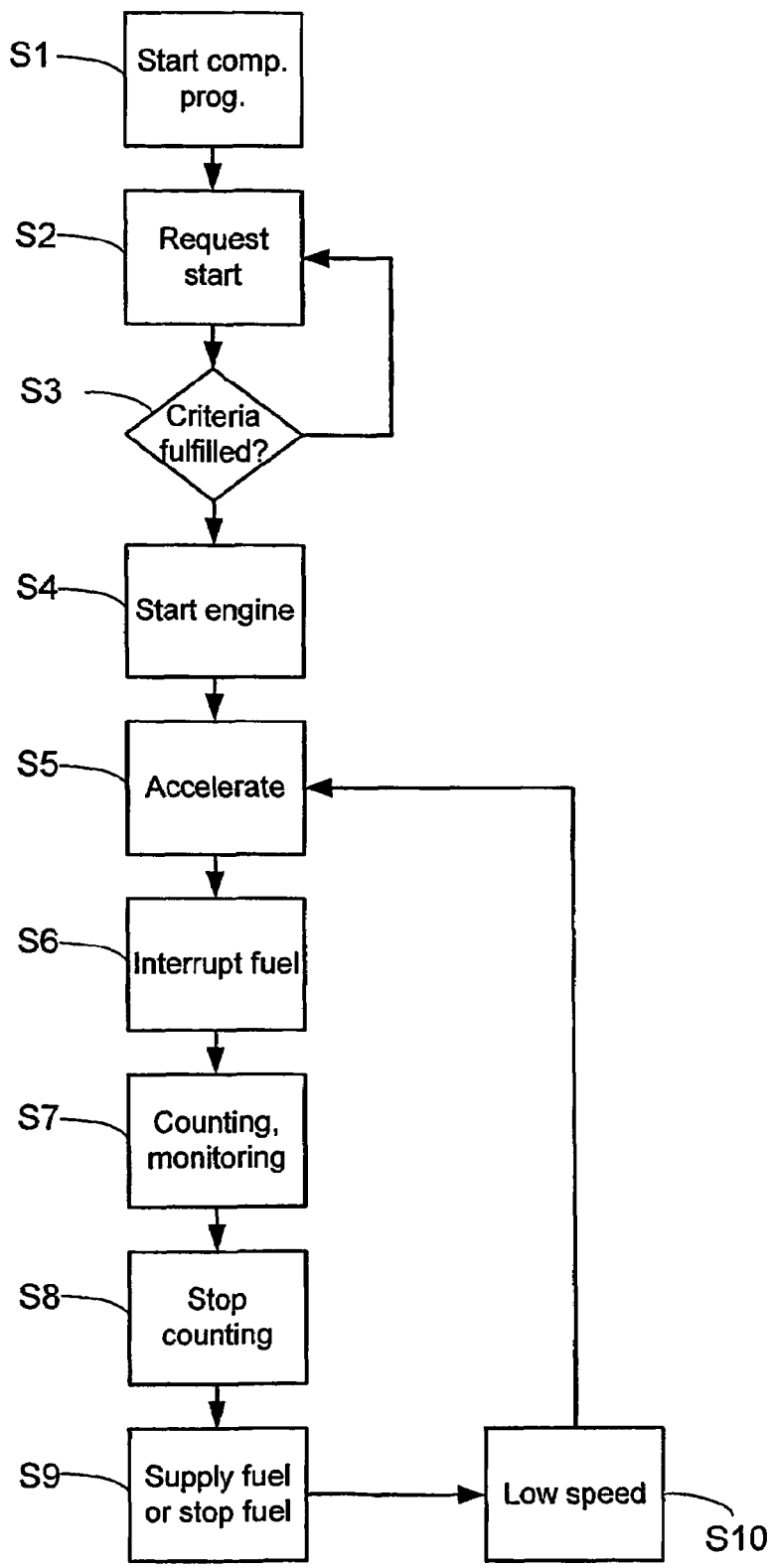
FIG. 5 shows a block diagram of an embodiment of the method.

An embodiment of the method according to the invention will now be described in conjunction with FIG. 4 and FIG. 5. As an initial first step S1, a person starts the cylinder test computer program on the external computer 10, which causes a display 25 (see FIG. 1) connected to the external computer 10 to show e.g. a GUI (graphical user interface). In a second step S2, the person requests a start of the cylinder test by e.g. pushing a start button in the GUI. The request is sent to the engine control unit 3, which in a third step S3 checks whether all of at least one criterion for starting the cylinder test is fulfilled. The criterion may be that the gear signal is received from the transmission sensor 9, i.e. that the gearbox is in the neutral position. Another criterion may be that the parking brake (not shown) of the vehicle is activated. Yet another criterion is that the sensed vehicle speed is zero or below a certain value. Still another criterion may be that a pedal position sensor (not shown) indicates that e.g. the clutch pedal is unaffected. If the at least one criterion is not fulfilled, the request to start the testing will be denied and step S2 has to be carried out again. When the at least one criterion is fulfilled the cylinder test is started and the method continues with a fourth step S4 in which the cylinder test computer program causes the external computer 10 to instruct the engine control unit 3 to start the combustion engine 1. When the combustion engine 1 has been started and is running at a relatively low speed L0, e.g. idle speed, a fifth step S5 starts, in which the cylinder test computer program causes an acceleration of the combustion engine up to a first engine speed L1. All the cylinders 2a-2d could throughout this acceleration be supplied with an equal amount of fuel. The first engine speed L1 preferably corresponds to a speed level above typical propulsion conditions of the vehicle. When the first engine speed L1 is reached, the fuel supply to all cylinders except the cylinder to be tested is interrupted. This is done in a sixth step S6, which correspond to the time $t_0$ in FIG. 4. The fuel supply to only the tested cylinder is not enough to keep the first engine speed L1, since the braking effect caused by e.g. internal compression strokes in the other cylinders is more powerful than the power output from the tested cylinder when the engine is running at the first engine speed L1. Therefore the interruption in step S6 causes the speed of the engine to decrease. The fuel supply to the tested cylinder may even be increased without overcoming the braking effect. Thus the fuel injection for each cylinder up to L1 may be kept relatively low compared to the fuel injection for the tested cylinder after the fuel interruption to the other cylinders. At the same time as the fuel supply is interrupted, i.e. at time $t_0$, the engine control unit 3 and/or the external computer 10 starts to count the time, while monitoring of the speed of the engine continues. This is performed in a seventh step S7. In an alternative seventh step S7 the counting starts when the speed of the engine has decreased to a second engine speed L2 after the interruption, which second speed L2 in this embodiment only is slightly lower than the first engine speed L1. The start of the counting in the alternative seventh step corresponds to time $t_1$ in FIG. 4, in which $t_1$ is soon after the interruption of the fuel supply in order to still be able to test an individual cylinder working at a relatively high engine speed. As soon as the speed of the engine has decreased to a predetermined third speed L3, the counting stops. The stopping is executed in an eighth step S8, which corresponds to time $t_2$ in FIG. 4. The time between $t_0$ and $t_2$, or in the alternative step S7, $t_1$ and $t_2$, is then used for, e.g., a direct comparison with a deceleration time for a healthy cylinder. The deceleration time for the healthy cylinder may for instance be stored in a database in the external computer 10, suitably as a part of the cylinder test computer program. If the measured time between $t_0$ and $t_2$ and $t_1$ and $t_2$ respectively, deviates more from the deceleration time for the healthy cylinder than to a predetermined extent, a conclusion can be drawn that there is a fault associated with the tested cylinder.

In a ninth step S9 in this embodiment, an equal amount of fuel is supplied again to all the cylinders after the third engine speed has been reached and the counting has stopped. The start of the fuel supply corresponds to the time $t_3$ in FIG. 4. However, this time the fuel supply is much lower than during the acceleration in step S5, and the speed of the engine continues to decrease, but in a more controlled way, down to the low speed L0, where, if needed, more fuel is supplied in order to keep the low speed L0 when reached. The low speed L0 is controlled during a tenth step S10. In an alternative step S9, the fuel supply to the tested cylinder is interrupted after the counting has stopped. The interruption in the alternative step S9, may be performed with the help of the ordinary engine control computer program, which may order the engine to return to idle speed. Typical modern engine control computer programs causes an immediate interruption of the fuel supply if a current speed is higher than a requested speed. The alternative step S9 saves fuel and causes a faster return to the low speed L0. Fuel is again supplied to all the cylinders 2a-2d first when the speed of the engine has reached down to or is close to the low speed L0 in order to maintain the low speed L0 before the steps S5-S10 are repeated.

The steps S5-S10 may be repeated several times for testing one of the cylinders several times in order to get a mean time value which statistically is more accurate than a single performance of the steps S5-S10. The steps S5-S10 may also be repeated for all the cylinders, i.e. another cylinder may be tested in a subsequent repetition of step S5-S10 directly following a previous performance of step S5-S10 in which another cylinder was tested. The checking of the at least one criterion suitably continues as long as one of the steps S4-S10 is performed. If, for example, the gear signal ceases from the transmission sensor 9, the testing and the fuel supply to the combustion engine 1 are immediately interrupted.

The invention claimed is:

1. A computing device operable to identify a fault associated with an individual cylinder of a multicylinder combustion engine and comprising a memory operable to store a software application that comprises:

first program code operable to instruct an engine control unit to supply fuel to all cylinders in the multicylinder combustion engine and to accelerate the combustion engine to a first engine speed;

second program code operable to instruct the engine control unit after the first engine speed is reached to interrupt supplying fuel to all cylinders in the multicylinder engine except the individual cylinder, wherein the engine speed decreases to a second engine speed as a function of the fuel supply being interrupted and the computing device is operable to identify the fault associated with the individual cylinder based on a determinable time counted while the speed of the engine decreases to the second engine speed.

2. The computing device of claim 1, wherein third program code counts the time during which the speed of the engine decreases to the second engine speed.

3. The computing device of claim 1, wherein the engine control unit or a computer counts the time during which the speed of the engine decreases to the second engine speed.

4. The computing device of claim 1, wherein the device is at least one of an engine control unit and a computer connected to the engine control unit.

5. The computing device of claim 1, wherein the third program code counts the time during which the speed of the engine operating at either the first engine speed or a third engine below the first engine speed decreases to the second engine speed.

6. A processor-readable medium incorporating a program of instructions operable to run an engine control unit, wherein the program of instructions is operable to identify a fault associated with an individual cylinder of a multicylinder combustion engine and comprises:

first instructions operable to control the engine control unit to cause a fuel supply to all cylinders in the multicylinder engine to accelerate the combustion engine to a first engine speed;

second instructions operable to control the engine control unit after the first engine speed is reached to cause an interruption of fuel supply to all cylinders in the multicylinder engine except the individual cylinder, wherein the engine speed decreases to a second engine speed as a function of the fuel supply being interrupted; and third instructions operable to identify the fault associated with the individual cylinder based on a determinable time counted while the speed of the engine decreases to the second engine speed.

7. The processor-readable medium of claim 6, wherein the time is counted by fourth instructions of the program of instructions.

8. The processor-readable medium of claim 6, wherein the time is counted by the engine control unit or by a computer connected to the engine control unit.

9. The processor-readable medium of claim 6, wherein the program of instructions further comprises a graphical user interface operable on a display; and fifth instructions operable to cause the control unit or a computer to display the interface.

10. The processor-readable medium of claim 6, wherein the program of instructions is operable to store in a memory at least one criterion for testing the individual cylinder, and the program of instructions further comprising sixth instructions operable to check whether all of the at least one criterion for testing the individual cylinder is fulfilled.

11. The processor-readable medium of claim 6, wherein the program of instructions is operable to store in a memory a time value, and further comprises seventh instructions operable to compare the time value with the time counted.

12. The processor-readable medium of claim 6, wherein the third instructions are operable to count the time during which the speed of the engine operating at either the first engine speed or a third engine speed below the first engine speed decreases to the second engine speed.

13. A method for identifying a fault associated with an individual cylinder of a multicylinder combustion engine, the method comprising the steps of:

supplying a fuel supply to all of the cylinders of the engine and accelerating the combustion engine to a first engine speed;

when the first engine speed is reached, interrupting the fuel supply to all cylinders except the individual cylinder, while supplying the individual cylinder with a predetermined amount of fuel supply wherein the engine speed decreases to a second engine speed; and counting the time it takes for the speed of the combustion engine to decrease from an engine speed above the second engine speed down to the second engine speed.

14. A method for identifying a fault associated with an individual cylinder of a multicylinder combustion engine, the method comprising the steps of:

supplying a fuel supply to all of the cylinders of the engine and accelerating the combustion engine to a first engine speed;

when the first engine speed is reached, interrupting the fuel supply to all cylinders except the individual cylinder, while supplying the individual cylinder with a predetermined amount of fuel supply; and counting the time it takes for the speed of the combustion engine to decrease from either the first engine speed or a second engine speed, which is lower than the first engine speed, down to a third engine speed.

15. A method according to claim 14, wherein the step of supplying a fuel supply to all of the cylinders comprises supplying a substantially equal amount of fuel to all cylinders during the step of accelerating the combustion engine.

16. A method according to claim 14, further comprising, after the third engine speed has been reached, interrupting the fuel supply to the individual cylinder.

17. A method according to claim 14, further comprising the step of keeping the speed of the combustion engine at a substantially constant speed lower than the third engine speed, and repeating the method for identifying the fault for a second cylinder of the multicylinder combustion engine.

18. A method according to claim 14, further comprising the step of comparing the counted time with a predetermined time representing a deceleration time for a well-functioning one of the cylinders.

19. A method according to claim 14, wherein the combustion engine is a diesel engine in a vehicle.

\* \* \* \* \*